(12) United States Patent
vom Stein et al.

(10) Patent No.: US 10,710,151 B2
(45) Date of Patent: Jul. 14, 2020

(54) SEAL CASSETTE FOR A CONTINUOUS CASTING MACHINE

(71) Applicant: Aktiebolaget SKF, Gothenburg (SE)

(72) Inventors: Hans-Joachim vom Stein, Odenthal (DE); Erik Mitchell, Hovås (SE)

(73) Assignee: Aktiebolaget SKF, Gothenburg (SE)

( * ) Notice: Subject to any disclaimer, the term of this patent is extended or adjusted under 35 U.S.C. 154(b) by 99 days.

(21) Appl. No.: 15/865,828

(22) Filed: Jan. 9, 2018

(65) Prior Publication Data

US 2018/0200784 A1 Jul. 19, 2018

(30) Foreign Application Priority Data

Jan. 18, 2017 (DE) .................. 10 2017 200 738

(51) Int. Cl.
| | |
|---|---|
| *B22D 11/128* | (2006.01) |
| *F16J 15/3232* | (2016.01) |
| *F16J 15/3256* | (2016.01) |

(52) U.S. Cl.
CPC ........ *B22D 11/1287* (2013.01); *B22D 11/128* (2013.01); *F16J 15/3232* (2013.01); *F16J 15/3256* (2013.01)

(58) Field of Classification Search
CPC ................................................. B22D 11/128; B22D 11/1287; F16J 15/3232; F16J 15/3256
See application file for complete search history.

(56) References Cited

U.S. PATENT DOCUMENTS

| | | | | |
|---|---|---|---|---|
| 2001/0030398 A1* | 10/2001 | Hosokawa | ............. | F16J 15/002 277/549 |
| 2002/0063393 A1* | 5/2002 | Sassi | .................. | B22D 11/1287 277/551 |
| 2014/0084672 A1* | 3/2014 | Giraudo | ............... | F16J 15/3256 301/109 |
| 2016/0348791 A1 | 12/2016 | Wagoner et al. | | |

FOREIGN PATENT DOCUMENTS

| | | |
|---|---|---|
| EP | 1537927 A | 6/2005 |
| EP | 1772639 A2 | 4/2007 |
| GB | 1034756 A | 7/1966 |
| JP | 2005308229 A | 11/2005 |

* cited by examiner

*Primary Examiner* — Kevin E Yoon
(74) *Attorney, Agent, or Firm* — Garcia-Zamor Intellectual Property Law, LLC; Ruy Garcia-Zamor; Bryan Peckjian

(57) ABSTRACT

A seal cassette for a roll line in a continuous casting machine. The seal cassette configured to seal off a space from an outside environment and includes a first circumferential element and a second circumferential element arranged coaxially and rotatably movable relative each other. At least one third circumferential element is provided and is arranged coaxially relative the first and the second circumferential element and further arranged to be rotatably movable relative the second circumferential element. The first circumferential element is formed as a sleeve extending in an axial direction (A). The second circumferential element provides at least one circumferential seal portion arranged to seal between the second element and the first element. The at least one third circumferential element provides at least one circumferential seal portion to seal between the third element and the second element and further provides a circumferential seal portion that seals against the first element.

15 Claims, 3 Drawing Sheets

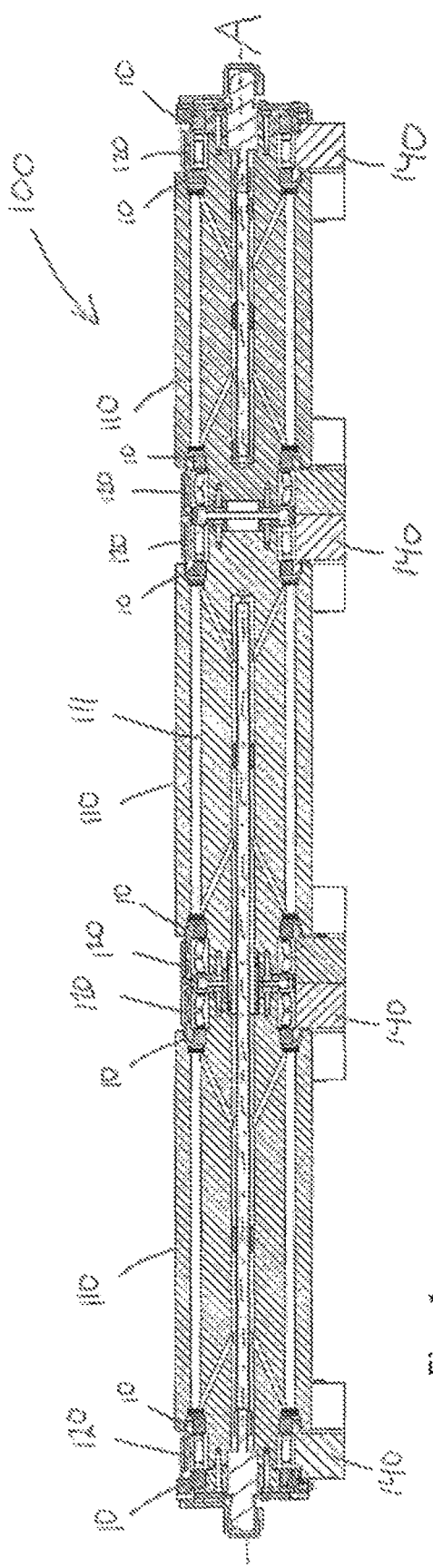
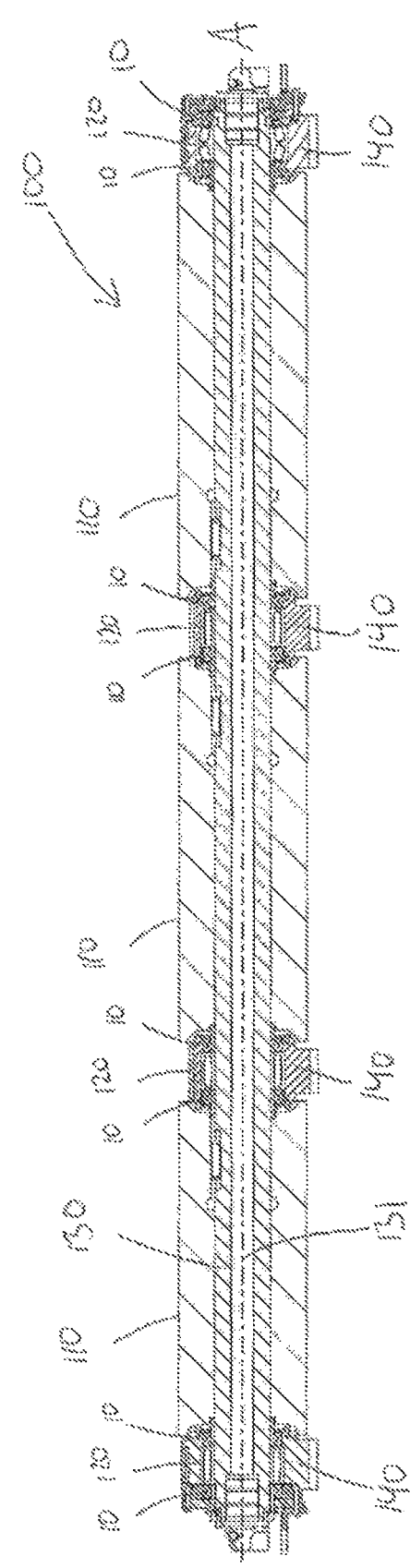
Fig. 4
Fig. 5

SEAL CASSETTE FOR A CONTINUOUS CASTING MACHINE

CROSS-REFERENCE

This application claims priority to German patent application no. 102017200738.9 filed on Jan. 18, 2017, the contents of which are fully incorporated herein by reference.

TECHNOLOGICAL FIELD

Generally, the present invention relates to seals and seal cassettes for sealing off spaces from an external environment, such as a spaces containing rolling bearings.

More particularly, according to a first aspect, the present invention regards a seal cassette for a roll line in a continuous casting machine. According to a second aspect, the present invention regards a roll line for a continuous casting machine, which roll line comprises a seal cassette according to the first aspect of the present invention.

BACKGROUND

Continuous casting of steel is a very demanding process. It is characterized by a harsh environment which is very corrosive with very high temperatures, and contains plenty of cooling water, water steam, casting salt etcetera. Due to these circumstances, the mechanical components of a continuous casting machine has to be rigorously designed to withstand such difficult conditions.

A continuous casting machine comprises a plurality of roll lines designed to support a moving steel strand which is produced from molten steel that has been poured from a ladle into a tundish in the top of the machine. During the process the steel strand solidifies and in the end an elongated steel profile exits the machine, which is subsequently cut or divided into shorter lengths. During the solidification process, water is sprayed onto the steel strand and the supporting roll lines.

Particularly critical components in the continuous casting machine are the rolling bearings which are rotatably supporting the roll mantles and/or roll bodies of the roll lines. In order to extend the service life of the rolling bearings it is known to make use of seal cassettes to seal off the spaces that contain the rolling bearings. Such seal cassettes has to be designed for the very harsh conditions in order to withstand the high temperatures, the casting salt and the present water and water steam. In addition, there are also other particles that needs to be sealed off from the spaces containing the rolling bearings. For example, during the process metal scale or metal flakes might loosen from the steel strand. It has been realized that such scale or flakes can be very harming for the sealing function.

SUMMARY

In view of the above, an object of the present invention is to provide an improved seal cassette design that can withstand the difficult conditions in a continuous casting machine. More particularly, an object of the present invention is to provide an improved seal cassette that can prolong the service life of the rolling bearings in the roll lines of the continuous casting machine.

The objects are achieved by the subject matter as specified in the independent claim. Preferred embodiments of the invention can be found in the dependent claims and in the accompanying description.

According to the the first aspect thereof, the object is achieved by a seal cassette for a roll line in a continuous casting machine, wherein the seal cassette is meant to seal off a space from an outside environment. The seal cassette comprises a first circumferential element and a second circumferential element, wherein the first and second circumferential elements are arranged coaxially and rotatably movable relative each other. It further comprises at least one third circumferential element, wherein the third circumferential element is arranged coaxially relative the first and the second circumferential element and further arranged to be rotatably movable relative the second circumferential element. The first circumferential element is formed as a sleeve or a sleeve-like element extending in an axial direction. The second circumferential element presents at least one circumferential seal portion arranged to seal between the second element and the first element. The at least one third circumferential element presents at least one circumferential seal portion to seal between the third element and the second element wherein the at least one third circumferential element further presents a circumferential seal portion which is sealing against the first element. In addition, the at least one third circumferential element is axially movable relative the first element and radially movable relative the second element.

With the proposed design, a more robust seal cassette that can withstand the very harsh environments in a continuous casting machine has been realized. Especially, the ability of the third circumferential element to be able to be axially movable relative the first element and at the same time be radially movable relative the second circumferential element has shown to improve the sealing function essentially. Due to the high temperatures in the machine, the components will expand and therefore it has been realized that it would be advantageous if the seal cassette could withstand both axial and radial movements. In addition, radial movements may also be caused by deformations from the high loads that are acting on the roll lines and also by the play/clearance that may be present in the bearing arrangement of the roll line. Radial movements caused by such factors will be compensated for by the present design.

Moreover, with the proposed design an improved sealing function for a re-lubrication free roll line design has been accomplished. In known designs, one has for example relubricated the spaces containing the rolling bearing's during the process in order to try to prolong the service life of the bearings and to maintain the sealing functionality. This is however not a preferred solution from e.g. a cost and environmental perspective for the continuous casting machine. The new proposed seal cassette design will lead to an improved re-lubrication free solution that has both cost and environmental advantages in relation to the prior art. The service life of the roll lines in prior art machines has many times been too short, and thus the cost for running a continuous casting process has been unnecessary high due to shorter intervals between maintenance stops. With the new proposed design, the service life of the bearings and consequently the roll lines will be extended.

In an embodiment of the present invention, the at least one third circumferential element further presents a circumferential scraper which is sealing against the first element, and wherein the at least one third circumferential element is further axially movable relative the first element and radially movable relative the second element. The design of the embodiment provides a scraper that has a scraping functionality that will scrape off any debris (such as metal scale/flakes and casting salt) from the sleeve's surface when the seal cassette expands axially during a running cycle of the continuous casting machine. It has namely also been realized that it may be essential for the sealing functionality to keep any such debris outside the seal cassette so that it does not reach the seal portion of the second circumferential element that is sealing against the first element, which would impair the sealing function.

The third circumferential element may in one embodiment act as a first barrier for the seal cassette, which will prevent especially scale and flakes from entering the seal cassette interior. The at least one seal portion of the second circumferential element that is sealing against the first element will in an embodiment act as a second barrier that is especially intended for sealing off from any water or water steam to enter into the sealed off space.

In an embodiment of the present invention, the at least one third circumferential element is located on an axially outboard position relative the at least one seal portion of the second circumferential element that is sealing against the first element, seen from the space that is meant to be sealed off.

In an embodiment, the at least one third circumferential element is a separate element which is not fixed to any one of the first and second circumferential elements such that it can move in an axial direction relative the first circumferential element and in a radial direction relative the second circumferential element.

The expressions axial and radial are used throughout this disclosure. Unless expressed otherwise an axial direction means a direction which is extending along a line around which at least some of the elements of the seal cassette is intended to rotate. A radial direction is any direction being perpendicuar to the axial direction. Axial and radial may also be used in relation to the roll line described herein. As for the seal cassette, an axial direction is extending along a rotational axle of the roll line and consequently, a corresponding radial direction is any direction being perpendicular to the axial direction.

In this disclosure, the expression seal portion is used. The expression refers a surface or any other portion that provides a sealing function between two elements. Even though the expression may be used as part of one of the two corresponding components or elements, it does not exclude that also the other one of the corresponding component or element has a corresponding seal portion at the same location, such as a seal surface made of any kind of material, e.g. steel, rubber, plastics etc.

In an embodiment of the present invention, the at least one third element is at least partly made of a plastic or a thermoplastic material (such as a thermoplastic polymer). In a further embodiment, the at least one third circumferential element is at least partly made of a plastic or thermoplastic polymer material which presents a glass transition temperature which is above any one of 100, 110, 120, 130 or 140° C. In other words, the material is in a hard or "glassy" state during normal operation of the continuous casting machine, which in turn will enhance the scraping functionality described herein.

In an embodiment of the present invention, the at least one third element is at least partly made of polyether ether ketone (PEEK).

In an embodiment of the present invention, the at least one third element comprises a reinforcing material to lower a thermal linear expansion coefficient. For example, if the third circumferential element is made of PEEK it may be reinforced by a reinforcing material, such as glass and/or carbon fiber. This would enhance the strength and rigidity of the element, but it would also lead to a reduced thermal linear expansion coefficient. In one embodiment, the thermal linear expansion coefficient of the at least one third circumferential element is less than 3, 2.5, 2, 1.9, 1.8 or $1.7*10^{-5}$° C. It may be advantageous for the sealing function between the third and the first element to have thermal linear expansion coefficients which does not differ too much between the components. For example, if the third circumferential element is made of steel, such as a corrosion resistant steel, the thermal linear expansion coefficient for the component may be somewhere around $1.8*10^{-5}$° C. In a further embodiment, the at least one third circumferential element contains 10-40 weight (wt) % of a reinforcing material, such as glass and/or carbon fiber. Optionally, the at least one third circumferential element contains 15-35, 20-30, 25-35 or 25-30 wt % of a reinforcing material.

In another embodiment of the present invention, the at least one third circumferential element is at least partly made of any one or a combination of copper, bronze or brass. Such materials may be advantageous in the harsh environment of the continuous casting process, and further the materials may present a thermal linear expansion coefficient which is satisfactory in view of the material used for the first circumferential element.

In an embodiment of the present invention, when the at least one third circumferential element presents a scraper, the scraper of the at least one third element presents an acute angle relative the first element as seen from the space that is meant to be sealed off. Such an angle may improve the scraping functionality when the third element is moving in an axial direction.

In an embodiment of the present invention, the at least one circumferential seal portion of the second element is a rubber seal. Optionally, the at least one rubber seal further presents a spring ring. Such a spring ring may be used to increase a radial pressure exterted towards the first circumferential element.

In an embodiment of the present invention, the seal cassette comprises a plurality of third circumferential elements which are axially displaced relative each other. In order to further improve the sealing function, one can make use of several elements designed as the third element described herein, thereby increasing the number of seal barriers.

In an embodiment of the present invention, the second circumferential element presents a plurality of circumferential seal portions to seal between the second element and the first element, wherein each one of the seal portions are located adjacent to a corresponding third element. As in the aforementioned embodiment, when the seal cassette comprises more than one third circumferential element, it may also be advantageous to include several corresponding seal portions of the second element to thereby further increase the sealing function. Alternatively, there may be only one third circumferential element followed by more than one circumferential seal portion on the second circumferential element for sealing against the first element.

In an embodiment of the present invention, the first element further presents a seal ring encircling the peripheral side which faces away from the second element. It may also be advantageous to provide so called static seals between any one or both of the surfaces on the outer peripheral sides of the seal cassette.

In an embodiment of the present invention, the first element is located radially inwardly from the second and the third element.

In an embodiment of the present invention, the at least one circumferential seal portion of the third circumferential element, which is sealing against the first circumferential element, exerts a radial force against the first element. If the circumferential seal portion on the third circumferential element is designed such that the inner diameter of the portion is smaller than the corresponding outer diameter of the first element (e.g. a sleeve), the sealing function may be improved (in the case when the first element is located radially inwardly from the second element). In the event the seal portion also presents a scraper function, an increased radial force may also improve the scraping function. In addition, the third element may due to this better handle radial displacements without impairing the sealing function.

In an embodiment of the present invention, the at least one rubber seal is made of hydrogenated nitrile butadiene rubber (HNBR). In another embodiment, the at least one seal portion of the second circumferential element is any kind of elastomer.

According to the second aspect thereof, the object is achieved by a roll line for a continuous casting machine. The roll line comprises at least one roll mantle or roll body that is arranged to support a steel strand and at least one bearing position comprising at least one bearing for rotatably supporting the at least one roll mantle or roll body. The roll line further comprises at least one seal cassette according to any of the embodiments of the first aspect of the invention for sealing off a space that contains the at least one bearing position. It shall be noted that any embodiment of the second aspect of the invention is applicable and combinable to any of the embodiments of the first aspect of the invention and vice versa, unless it is specifically stated otherwise.

BRIEF DESCRIPTION OF THE DRAWINGS

Exemplifying and preferred embodiments of the present invention will now be described more in detail, with reference to the accompanying drawings, wherein:

FIG. 4 shows a roll line according to an embodiment of the second aspect of the present invention.

FIG. 5 shows a roll line according to another embodiment of the second aspect of the present invention.

Figure 1:
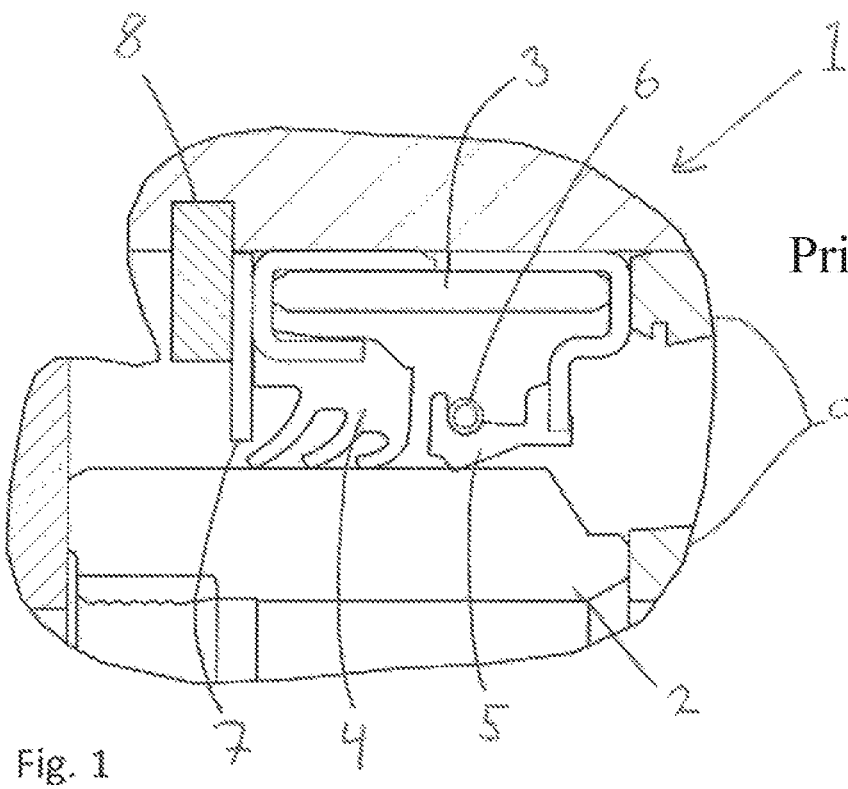
FIG. 1 shows an embodiment of a prior art seal cassette design.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention.

DETAILED DESCRIPTION

FIG. 1 illustrates a seal cassette design 1 as already known in the prior art. The seal cassette 1 comprises a radially inner sleeve 2 which is meant to be mounted onto a shaft or the like of a roll line. The seal cassette also comprises a radially outer ring element 3 which comprises a first seal ring 4 and a second seal ring 5. The first seal ring 4, which is the one which is located farthest away from the interior area containing a rolling bearing 9, is designed as a three-lip rubber seal. The seal lips presses against the sleeve 2. Inside the three-lip rubber seal 4 is the second seal ring 5 located, which is designed as a so called radial seal, which further presents a spring ring 6 meant to create an increased radial pressure against the sleeve 2, thereby improving the sealing function. Outside the seal cassette 1 is a metal shield ring 7 located, with e.g. the purpose to prevent excessive heat to reach the seal cassette 1. Outside the metal shield 7 a locking ring 8 can be seen that axially fixates the seal cassette. The seal cassette 1 provides a robust sealing function that is useful in harsh environments, such as continuous casting, but as mentioned hereinabove, there is room for improvement.

Figure 2:
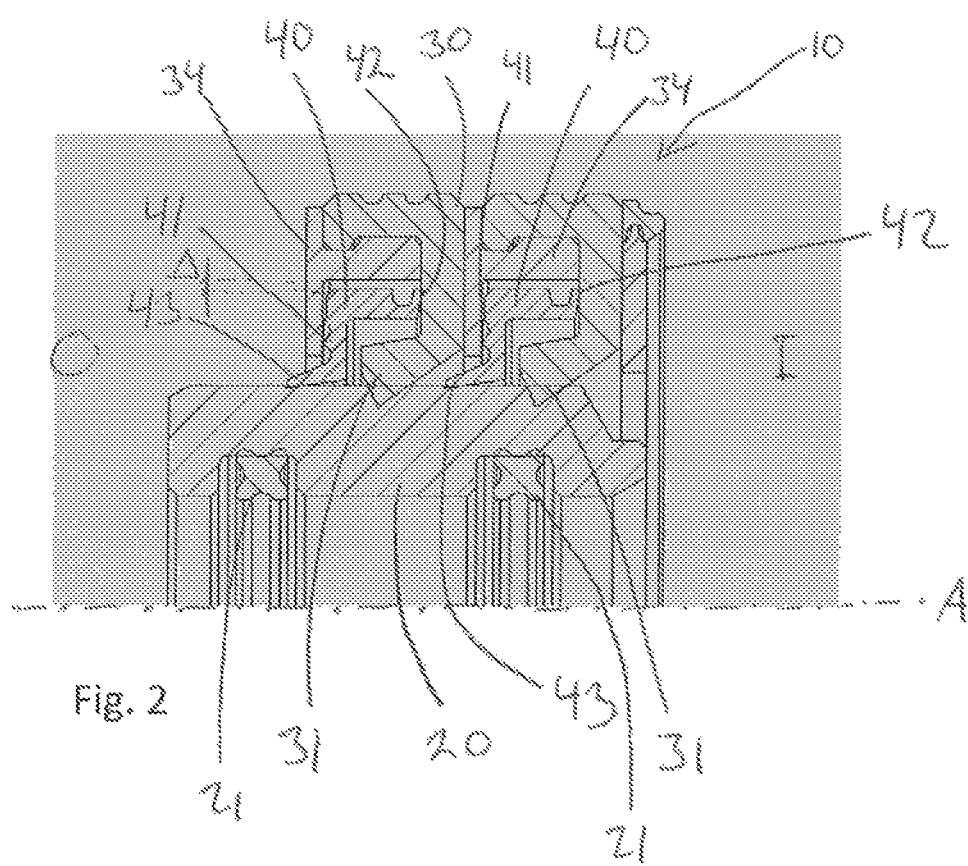
FIG. 2 shows a seal cassette design according to an embodiment of the present invention.

Turning to FIG. 2, an exemplifying embodiment of a seal cassette 10 according to the present invention can be seen. The seal cassette 10 is meant for a roll line in a continuous casting machine (not shown), wherein the seal cassette 10 is meant to seal off a space I from an outside environment. The inside I that is meant to be sealed off can be seen on the right-hand side of the figure whereas the outside O can be seen on the left-hand side. The seal cassette 10 comprises a first circumferential element 20 and a second circumferential element 30, wherein the first and second circumferential elements, 20 and 30 respectively, are arranged coaxially and rotatably movable relative each other in relation to a rotational axle A. The seal cassette 10 further comprises at least one third circumferential element 40, wherein the third circumferential element 40 is arranged coaxially relative the first and the second circumferential element, 20 and 30 respectively, and further arranged to be rotatably movable relative the second circumferential element 30. In this specific embodiment, the seal cassette 10 comprises two third circumferential elements 40 and 40 which are axially displaced. In addition, the two third circumferential elements 40 and 40 are located radially in-between the first and the second circumferential elements, 20 and 30 respectively.

The first circumferential element 20 is formed as a sleeve or a sleeve-like element extending in the axial direction A. The second circumferential element 30 presents at least one circumferential seal portion 31 arranged to seal between the second element 30 and the first element 20. In this specific embodiment, there are two seal portions 31 present which are located adjacent to a corresponding third circumferential element 40. The seal portions 31 are in this embodiment made of HNBR rubber. They may also comprise a spring ring (not shown) to thereby increase a radial pressure against the first element 20. In addition, in this embodiment, the second circumferential element comprises metal rings (such as sheet metal rings) 34. The two third circumferential elements, 40 and 40, present two circumferential seal portions, 41 and 42 on each element 40, to seal between the third element 40 and the second element 30, wherein the two third circumferential elements, 40 and 40, further presents circumferential scrapers, 43 and 43, which is sealing against the first element 20 and which is axially movable relative the first element 20, and wherein the at least two third circumferential elements 40 and 40 are further radially movable relative the second element 30.

In the figure it can be seen that there is a radial gap A present between the third circumferential element 40 and the second circumferential element 30. In the figure it can further be seen that the sleeve element 20 on its radially inner side presents sealing rings 21 for sealing between the sleeve 20 and the shaft or the like onto which the sleeve 20 is meant to be mounted. It shall be noted that even though this embodiment shows two third elements 40 including scrapers 43 and two seal portions 31 it could likewise be configured with only one third element 40 and one seal portion 31 on the second element 30 that seals against the first element 20. In addition, the peripheral radially outer side of the second element 30 is meant to be a mounting surface for the seal cassette 10.

Figure 3:
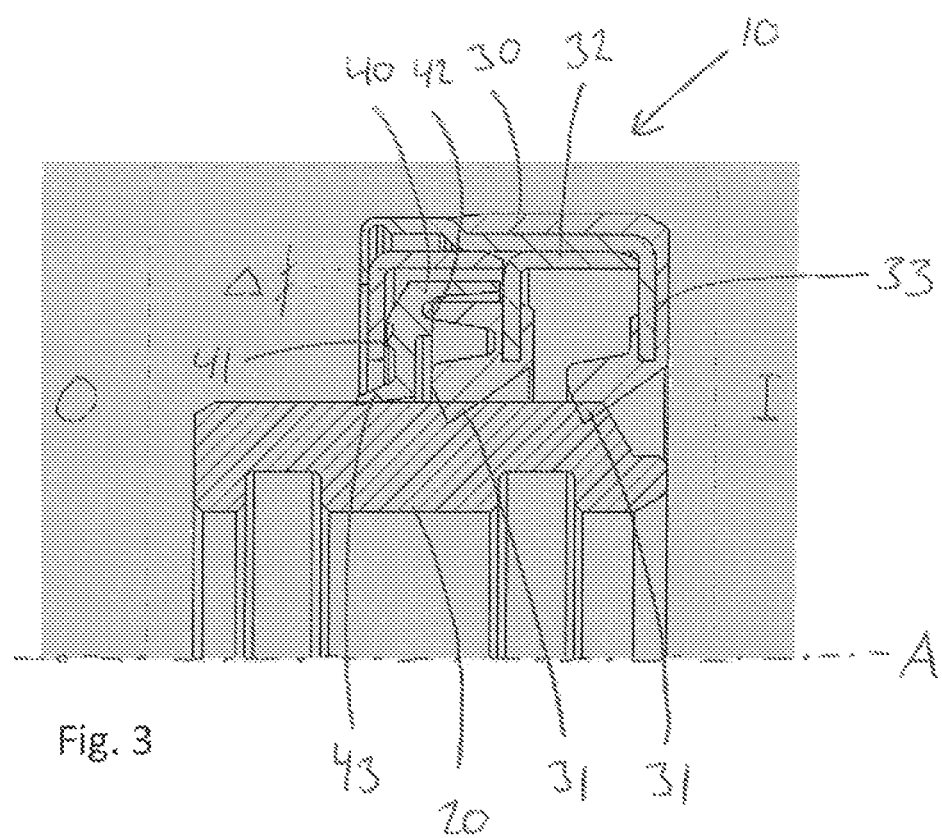
FIG. 3 shows a seal cassette design according to another embodiment of the present invention.

In FIG. 3 another embodiment according to the present invention can be seen. It shows a seal cassette 10 that comprises a first circumferential element 20 and a second circumferential element 30, wherein the first and second circumferential elements, 20 and 30 respectively, are arranged coaxially and rotatably movable relative each other in relation to a rotational axle A. The seal cassette 10 further comprises one third circumferential element 40, wherein the third circumferential element 40 is arranged coaxially relative the first and the second circumferential elements, 20 and 30 respectively, and further arranged to be rotatably movable relative the second circumferential element 30. The first circumferential element 20 is formed as a sleeve element extending in the axial direction A. The second circumferential element 30 presents two circumferential seal portions 31 and 31 arranged to seal between the second element 30 and the first element 20.

The third circumferential element 40 presents two circumferential seal portions, 41 and 42 respectively, to seal between the third element 40 and the second element 30, wherein the third circumferential element 40 further presents a circumferential scraper 43, which is sealing against the first element 20 and which is also axially movable relative the first element 20, and wherein the third circumferential element is further radially movable relative the second element 30. In the embodiment it can be seen that the third element 40 extends radially and is located in a corresponding radially extending space in the second element 30. The third element 40 can thus move in the radially extending space of the second element 30. In the figure it can further be seen that there is a radial gap A present between the third circumferential element 30 and the second circumferential element 20 to thereby allow a radial displacement. The second circumferential element 30 partly encloses the third circumferential element 40 and the radial gap A is located in the enclosure and radially above the third circumferential element 40. A similar configuration is also present on the embodiment as disclosed in FIG. 2.

Further, on the radially inner peripheral side of the sleeve element 20 two circumferential grooves can be seen that are meant to receive two respective sealing rings (not shown). Except for the difference to the embodiment in FIG. 2 where there are two third elements present instead of only one, the main difference lies in that the seal portions 31 and 31 in FIG. 3 have been molded onto two sheet metal rings, 32 and 33, of the second element 30. This design may for instance be more advantageous for series production of the seal cassette 10. As further can be seen, the scraper 43 presents an acute angle relative the first element as seen from the inside space I. The same configuration applies also to the embodiment as shown in FIG. 2.

FIG. 4 shows an embodiment of a roll line 100 according to the second aspect of the present invention. The roll line 100 comprises three roll bodies 110 that are arranged to support a steel strand (not shown) and six bearing positions 120 for rotatably supporting the three roll bodies 110 in relation to a rotational axis A. The roll line 100 further comprises eight seal cassettes 10 according to any of the embodiments of the first aspect of the invention for sealing off the spaces that contain the bearing positions 120. The bearings are mounted into respective bearing housings 140 which are sealed off by the seal cassettes 10. In this embodiment, the bearings are configured as spherical roller bearings and toroidal roller bearings.

Alternatively, the bearings could be any other type of bearing or rolling bearing, such as for instance a tapered roller bearing. The seal cassettes 10 are mounted into respective openings as seen from axial side views of the roll line 100, i.e. views which are represented by a plane that is perpendicular to the rotational axle A of the roll line 100. Further, the outer peripheral circumferential surface of the second element 30 is a mounting surface that is in contact with a corresponding inner circumferential mounting surface of the bearing housing 140. In addition, the inner circumferential surface of the first element 20 is also a mounting surface that is in contact with another corresponding mounting surface of the roll body 110.

Alternatively, the mounting surface onto which the first element 20 is mounted may be located in the bearing housing, on a shaft or on any other component of the roll line 100. Further, the roll bodies 110 present cooling channels 111 for internally cooling the roll line 100.

FIG. 5 shows another embodiment of a roll line 100 according to the second aspect of the present invention. The roll line in this embodiment 100 comprises three roll mantles 110 that are arranged to support a steel strand (not shown) and four bearing positions 120 for rotatably supporting the three roll mantles 110 in relation to a rotational axis A. The bearings in the bearing positions 120 are in this embodiment mounted onto a shaft 130, which shaft includes an internal cooling channel 131. The roll line 100 further comprises eight seal cassettes 10 according to any of the embodiments of the first aspect of the invention for sealing off the spaces that contain the bearing positions 120. The bearings are mounted into respective bearing housings 140 which are sealed off by the seal cassettes 10.

In this embodiment, the bearings are configured as spherical roller bearings and toroidal roller bearings. Alternatively, the bearings could be any other type of bearing or rolling bearing, such as for instance a tapered roller bearing. The seal cassettes 10 are mounted into respective openings as seen from axial side views of the roll line 100, i.e. views which are represented by a plane that is perpendicular to the rotational axle A of the roll line 100. Further, the outer peripheral circumferential surface of the second element 30 is a mounting surface that is in contact with a corresponding inner circumferential mounting surface of the bearing housing 140. In addition, the inner circumferential surface of the first element 20 is also a mounting surface that is in contact with another corresponding mounting surface of the shaft 130. Alternatively, the first element 20 may also be mounted onto any other element, such as for instance an intermediate sleeve or the like.

The invention is not limited to the embodiments described herein. It would be evident for the skilled person that other embodiments and modifications to the embodiments specified hereinabove are also possible within the scope of the claims.

REFERENCE SIGNS

1: Prior art seal cassette
2: Sleeve element
3: Radially outer ring element
4: Seal ring
5: Seal ring
6: Spring ring
7: Metal shield
8: Locking ring 10: Seal cassette
20: First circumferential element
21: Seal ring
30: Second circumferential element
31: Seal portion
32: Metal ring
33: Metal ring
34: Metal ring
40: Third circumferential element
41: Seal portion
42: Seal portion
43: Seal portion or scraper
100: Roll line
110: Roll mantle or roll body
120: Bearing position
130: Shaft
131: Internal cooling channel
140: Bearing housing

What is claimed is:

1. A seal cassette for a roll line in a continuous casting machine, the seal cassette configured to seal off a space from an outside environment, and comprising,
a first circumferential element and a second circumferential element, wherein the first and second circumferential elements are arranged coaxially and rotatably movable relative each other,
at least one third circumferential element, wherein the third circumferential element is arranged coaxially relative the first and the second circumferential elements and further arranged to be rotatably movable relative the second circumferential element,
the first circumferential element being formed as a sleeve extending in an axial direction (A),
the second circumferential element provides at least one circumferential seal portion arranged to seal between the second element and the first element,
the at least one third circumferential element provides at least one circumferential seal portion to seal between the third element and the second element, wherein
the at least one third circumferential element further presents a circumferential seal portion that seals against the first element, and wherein
the at least one third circumferential element is axially movable relative the first element and radially movable relative the second element.

2. The seal cassette according to claim 1, wherein the at least one third circumferential element further presents a circumferential scraper that seals against the first element.

3. The seal cassette according to claim 2, wherein the scraper of the at least one third element presents an acute angle relative the first element as seen from the space configured to be sealed off.

4. The seal cassette according to claim 1, wherein the at least one third element is located on an axially outboard position relative the at least one seal portion of the second element seen from the space that is meant to be sealed off.

5. The seal cassette according to claim 1, wherein the at least one third element is at least partly made of any one of or a combination of a plastic material, a thermoplastic material, or polyether ether ketone (PEEK).

6. The seal cassette according to claim 5, wherein the at least one third element comprises a reinforcing material to lower a thermal linear expansion coefficient.

7. The seal cassette according to claim 1, wherein the at least one circumferential seal portion of the second element is a rubber seal.

8. The seal cassette according to claim 7, wherein the at least one rubber seal is made of hydrogenated nitrile butadiene rubber (HNBR).

9. The seal cassette according to claim 1, wherein the at least one circumferential seal portion of the second circumferential element further provides a spring ring.

10. The seal cassette according to claim 1, wherein the seal cassette comprises a plurality of third circumferential elements that are axially displaced relative each other.

11. The seal cassette according to claim 10, wherein the second element provides a plurality of circumferential seal portions, and wherein each of the seal portion is located adjacent to a corresponding third element.

12. The seal cassette according to claim 1, wherein the first element further provides a seal ring encircling the peripheral side that faces away from the second element.

13. The seal cassette according to claim 1, wherein the first element is located radially inwardly from the second and the third element.

14. The seal cassette according to claim 1, wherein the at least one circumferential sealing portion of the third circumferential element, which seals against the first element, exerts a radial force against the first element.

15. The roll line for a continuous casting machine, comprising:
at least one roll mantle or roll body arranged to support a steel strand,
at least one bearing position comprising at least one bearing for rotatably supporting the at least one roll mantle or roll body,
wherein the roll line comprises at least one seal cassette according to claim 1 for sealing off a space that contains the at least one bearing position.

* * * * *